(12) United States Patent
Gromadskyi

(10) Patent No.: US 12,040,512 B2
(45) Date of Patent: Jul. 16, 2024

(54) METHOD OF PRODUCING SEPARATOR PLATES

(71) Applicant: BLUE WORLD TECHNOLOGIES HOLDING APS, Aalborg Ost (DK)

(72) Inventor: Denys Gromadskyi, Ellidshoj (DK)

(73) Assignee: BLUE WORLD TECHNOLOGIES HOLDING APS, Aalborg Ost (DK)

( * ) Notice: Subject to any disclaimer, the term of this patent is extended or adjusted under 35 U.S.C. 154(b) by 295 days.

(21) Appl. No.: 17/635,175

(22) PCT Filed: Aug. 7, 2020

(86) PCT No.: PCT/DK2020/000242
§ 371 (c)(1),
(2) Date: Feb. 14, 2022

(87) PCT Pub. No.: WO2021/027999
PCT Pub. Date: Feb. 18, 2021

(65) Prior Publication Data
US 2022/0293969 A1 Sep. 15, 2022

(30) Foreign Application Priority Data
Aug. 14, 2019 (DK) .............................. PA2019 70518

(51) Int. Cl.
*H01M 8/0226* (2016.01)
*H01M 8/0213* (2016.01)
(Continued)

(52) U.S. Cl.
CPC ....... *H01M 8/0226* (2013.01); *H01M 8/0213* (2013.01); *H01M 8/0221* (2013.01); *H01M 8/1048* (2013.01)

(58) Field of Classification Search
None
See application file for complete search history.

(56) References Cited

U.S. PATENT DOCUMENTS 3,935,029 A   1/1976   Baker et al.
6,544,680 B1  4/2003   Takano et al.
(Continued)

FOREIGN PATENT DOCUMENTS

CN   101174695 A   5/2008
DK      179150 B1  12/2017
(Continued)

OTHER PUBLICATIONS

International Search Report for PCT/DK2020/000242, Prepared by the Nordic Patent Institute, mailing date Oct. 26, 2020, 2 pages.
(Continued)

*Primary Examiner* — Yung-Sheng M Tsui
(74) *Attorney, Agent, or Firm* — Brooks Kushman P. C.; John E. Nemazi

(57) ABSTRACT

A separator plate is produced by hot compacting a pliable and malleable material made from a blend of powder containing at least 70% carbon powder, 10-20% of polyphenylene sulfide, PPS, and 0.005-10% PolyTetraFluoro-Ethylene, PTFE. Advantageously, the powder is suspended in water without using isopropanol. A method of producing a separator plate is also disclosed.

15 Claims, 5 Drawing Sheets

(51) Int. Cl.
    *H01M 8/0221*    (2016.01)
    *H01M 8/1048*    (2016.01)

(56)            References Cited

U.S. PATENT DOCUMENTS 6,803,139 B2    10/2004    Saito et al.
  2016/0197360 A1    7/2016     Ihm et al.
  2018/0358630 A1    12/2018    Woo et al.

FOREIGN PATENT DOCUMENTS

EP          1744389 B1       4/2009
  EP          2871697 A1       5/2015
  EP          1758185 A1       10/2018
  EP          3675258 A1       7/2020
  JP         62147662 A2       7/1987
  WO       2006095821 A1       9/2006
  WO       2013103345 A1       7/2013
  WO    WO-2018072803 A1 *     4/2018    .......... H01M 8/0213
  WO       2019039214 A1       2/2019

OTHER PUBLICATIONS

WO 2019039214, EP 3675258.

* cited by examiner

METHOD OF PRODUCING SEPARATOR PLATES

CROSS-REFERENCE TO RELATED APPLICATION

This application is the U.S. national phase of PCT Application No. PCT/DK2020/000242 filed on Aug. 7, 2020, which claims priority to DK Patent Application No. PA2019 70518 filed on Aug. 14, 2019, the disclosures of which are incorporated in their entirety by reference herein.

FIELD OF THE INVENTION

The present invention relates to a method of producing separator plates by hot-compaction. It also relates to a separator plate, such as bipolar plate for a fuel cell, obtainable by such method.

BACKGROUND OF THE INVENTION

Bipolar plates (BPPs) are one of the key components of some type of fuel cells, as they play a role of separators for single membrane-electrode assemblies, electrically connecting them in parallel and providing the required voltage of the stack.

High temperature and strong acidic media limit utilization of metallic BPPs due to their tendency to corrode, whereas carbon materials, and especially graphite, are attractive as alternatives to metal.

U.S. Pat. No. 6,544,680 discloses moulded separator plates with carbon and PPS but with the addition of a thermosetting resin. U.S. Pat. No. 6,803,139 discloses moulded separator plates with carbon and a thermoplastic, for example polyphenylene sulfide (PPS), but with the addition of carbodiimide. EP1758185 discloses moulded separator plates with 84% carbon, 2% PTFE, 14% epoxy that is cured in the hot press. Polyphenylene sulfide (PPS) or Polytetrafluoroethylene (PTFE), also called Teflon, are mentioned as thermoplastic resins but not exemplified. US2018/0358630 by Morgan discloses a compression moulding process for a bipolar plate for a fuel cell. EP2871697 discloses a sheet of PTFE and carbon for an electrode. WO2006/095821 discloses a thermoplastic resin composition for a fuel cell separator containing graphite and vapor-grown carbon fibers. WO2019/039214 discloses a fuel cell separator precurser that is obtained by impregnating a porous sheet.

There is a general aim of reaching high electrical conductivity and low areal specific resistance, namely at least 100 S/cm and 0.01 Ω·cm2, which is a 2020 target set by the US Department of Energy (DOE). In order to reach this target, the amount of graphite in the BPP composition should be rather high, namely more than 70 wt. %, and its particles should be uniformly distributed in the polymer binder. This can be achieved, for example, via grinding raw materials to micron or sub-micron dimensions with further intensive mixing the grinded powders.

A grinding process is disclosed in WO2018/072803 by SerEnergy, also disclosing use of PTFE for bonding powder of graphite and PPS into BPPs. In this disclosure, isopropanol plays important role as surfactant in the production process. However, in practice, it has turned out that iso-propyl alcohol is likely to provoke agglomeration of PTFE particles in the aqueous dispersion during mixing, which may be desired in some cases but which requires a relatively long time of stirring, which is undesirable from a commercial perspective, as it prolongs the production process. Using iso-propanol has another disadvantage in that work with iso-propanol requires strict safety rules and permanent control, especially at elevated temperatures, due to its high flammability as flash point is only 12° C. WO2018/072803 also discloses press-moulding while heated to a temperature below 200° C. or in the range of 250-320° C. However, in practice, neither the low nor the high temperature range has been found optimum for the press-moulding and neither for the physical properties of the final plate resulting from such process. There is a need for further improvements.

It would therefore be desirable to provide a method for production of separator plates, in which the use of iso-propanol can be avoided and which further results in an optimization of the process as well as the final product, while keeping the advantage of moulding of a pliable particular material.

DESCRIPTION/SUMMARY OF THE INVENTION

It is therefore the objective of the invention to provide an improvement in the art. In particular, it is an objective to provide an improved method for production of separator plates, especially BPPs. It is a further objective to provide a production method free of isopropanol. These and more objectives are achieved with a method of production a separator plate by hot compacting a pliable and malleable material made from a blend of powder containing carbon powder, PPS, and PTFE, for example for a fuel cell, as described in the following.

For a separator plate that is conductive, the material comprises a blend of powder containing
  at least 70% carbon powder,
  10-20% of polyphenylene sulfide, PPS, and
  0.005-10% PolyTetraFluoroEthylene, PTFE,
  all percentages by weight of the sum of the total weight of the powder.

Polyphenylene sulfide (PPS) is an advantageous binder for BPP because it is not dissolved in any solvent at temperatures below 200° C., and it has high melting point reaching 271-292° C., depending of the degree of crystallinity and molecular weight. As this melting point is significantly higher than operation temperatures of HT-PEM fuel cells, which are in the range 120-200° C., PPS is a useful candidate as a binder.

PTFE is highly advantageous over other thermoplastic binders when in combination with PPS due to through its high decomposition temperature (410° C.), inertness and other unique properties, including low coefficient of friction, high strength, toughness and self-lubrication.

Examples of carbon powder are graphite, carbon black, graphene, carbon nanotubes or amorphous carbon. A dominant concentration of graphite and/or carbon black are preferred. Typically, the size of the grains in the carbon black powder is in the sub-micron range, for example with an average size of between 20 and 100 nm. For graphite powder, the average grain size is in the range of 0.1 to 20 microns, typically however, in the range of 0.25 to 5 microns. When carbon black is used, optionally, carbon fibers, carbon nanotubes or graphene is added, typically in small quantities. This further increases the electrical conductivity of the separator plates, in particular BPPs.

For example, the PTFE is provided as a powder of finely divided PTFE. Examples of particle sizes are in the range of 0.2 to 10 microns, optionally in the range of 0.5 to 5 microns or even in the range of 0.5 to 2 microns.

In principle, the carbon powder can be mixed with PPS powder. Alternatively, the PPS is heated until molten, and the carbon is thoroughly mixed with the polymer, for example by stirring the molten polymer with the carbon powder, after which mix is compounded into hard pellets, which are then ground into fine powder. A typical average grain size is few micrometres, for example in the range of 2 to 5 micrometres. Due to the thorough mixing, each grain of the powder comprises carbon and polymer. However, the concentration of PPS is so low that a proper electrical conductivity is maintained.

The powder is mixed into an aqueous medium to provide an aqueous suspension, for example by mixing the powder under stirring into water with or without surfactant.

It is an advantage that an aqueous medium is used in contrast to a solvent medium. Thus, advantageously, the aqueous suspension is free of alcohol, in particular free of iso-propanol, which is in contrast to the prior art method disclosed in WO2018/072803. Avoiding alcohol makes the production safer and is also more environmentally friendly. Furthermore, the risk of agglomeration of the PTFE is reduced, leading to a better distribution of the particles in the material, which in turn allows reduction of the amount of PTFE. The latter, has a positive effect on the conductivity.

Especially for concentration of less than 0.1% PTFE, it has turned out to be advantageous if the aqueous suspension contains a carbonate ester, for example propylene carbonate. For higher concentrations, the addition of carbonate ester has not been found necessary. A suitable concentration of the carbonate ester is 0.1-10% relatively to the total content of liquid in the suspension. For example, the method comprises determining whether the amount of PTFE is higher or lower than 0.1% and providing the suspension with 0.1-10% of a carbonate ester only if the amount of PTFE is lower than 0.1%.

The aqueous suspension with carbon, PSS, and PTFE is heated to above the glass transition temperature of 124° C. of PTFE but below the melting point of PPS, which is in the range 271-292° C. It is noted that this temperature is also far below the melting point of PTFE. As the temperature is above the glass transition temperature of PTFE, the PTFE becomes malleable and fibridization of the PTFE is achieved. Further, water and potential surfactant is/are evaporated from the suspension. The time for the evaporation depends on the heating conditions, for example in the order of 5-30 minutes. After the evaporation, the polymer with the particles remains as a malleable and pliable substance.

This malleable and pliable substance is press rolled into a sheet. An example of a rolling process for carbon/polymer mixes is disclosed in US2005/0271798. A similar rolling procedure can be applied in connection with this method.

The rolling can be done without heated rollers, however, the evaporation of the residual liquid is faster when rolling at elevated temperature, for example at a temperature in the range of 65-195° C.

If a carbonate ester is part of the aqueous suspension, the method comprises heating the suspension with carbon, PSS and PTFE to a boiling point of the carbonate ester for evaporation of the carbonate ester prior to press rolling the malleable and pliable substance into a sheet. For example, for propylene carbonate the boiling temperature is 242° C.

After the forming of the sheet by press rolling and optional cutting into desired size, it is hot-compacted in a press-form at a first pressure P1 and at a temperature T to form a separator plate. The temperature T is above 220° C. and below the melting point of PPS. The melting point depends on the specific type of PPS and is in the range of 271-292° C. The moulding temperature is adjusted correspondingly in dependence of the actual melting temperature of the PPS used in the moulding process. Due to the temperature in the mould being below the melting point of PPS, risk of sticking of the sheet to the mould is minimized, which speeds up the process and also extends the lifetime of the mould. Furthermore, it has been found experimentally that higher values of in-plane electrical conductivity are reached for BPPs with such temperature restriction. Thus, the temperature restriction to below the melting temperature of PPS has several highly desired advantages as compared to the temperature range of up to 320° C. proposed in WO2018/072803.

The structuring of the separator plates in the mould includes the potential forming of a flow pattern, for example channels for flow of hydrogen fuel, oxygen-containing gas, or coolant, for example liquid coolant, such as water, Triethylene glycol (TEG), or silicone oil.

After the moulding, typically, no further structuring by machining of the separator plate is necessary.

For example, the method comprises moulding the sheet into a bipolar plate with a flow channel pattern on each side of the bipolar plate.

Optionally, the separator plates are arranged as an array with fuel cell membranes between the separator plates, the membranes separating the hydrogen fuel from the oxygen gas.

The production method is not only suitable for bipolar plates. It applies equally well to other separator plates, such as cathode plates, anode plates and cooling plates.

The invention is especially useful for fuel cells, particularly for high temperature proton exchange membrane (HT-PEM) fuel cells, but it could be also used for other electrochemical energy storage and conversion devices, for example, batteries, double-layer capacitors or electrolyzers.

In summary, the following advantages can be achieved with the invention:
- use of water and not alcohol for the mixing process during the production, which is environmentally friendlier and also safer in addition to reducing the risk for PTFE agglomerates,
- reduction of the PTFE content, which is beneficial for the conductivity,
- minimizing the risk of the sheet sticking to the mould, which makes the production process smoother, faster and extends the lifetime of the mould.

SHORT DESCRIPTION OF THE DRAWINGS

The invention will be explained in more detail with reference to the drawing, wherein FIG. 1 is a schematic image of fuel cell stack;

DETAILED DESCRIPTION/PREFERRED EMBODIMENT

Figure 1:
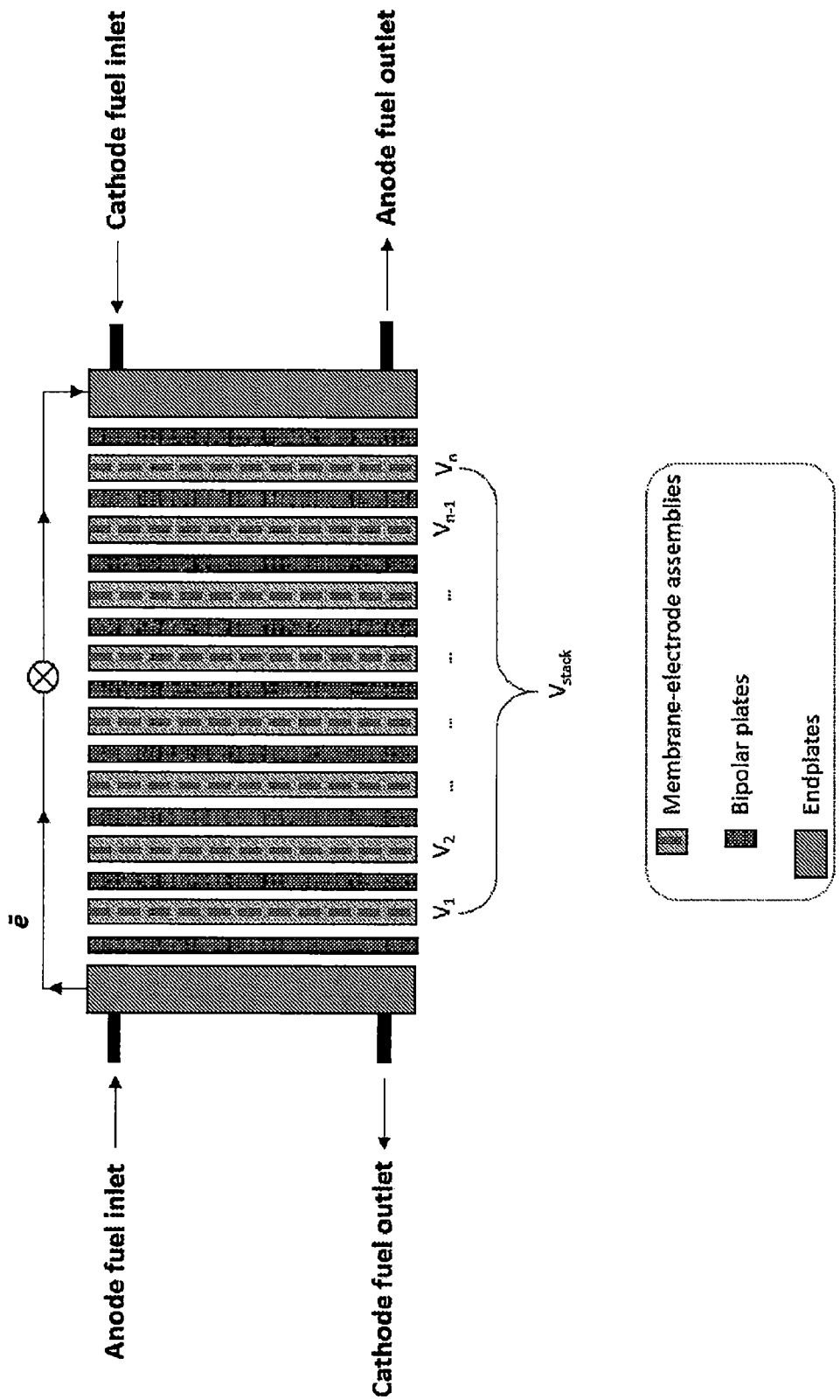

Bipolar plates (BPPs) are one of the key components of fuel cells, as they play role of separators for single membrane-electrode assemblies electrically connecting them in parallel way and providing required voltage of the stack, as Vstack=V1+V2+ . . . +Vn−1+Vn, which is also illustrated in FIG. 1.

As example of the production process is given by the following procedure. A pliable and malleable structure is provided from a fine powder mixture, which is formed into a quasi-elastic mat that is then hot-compacted into the separator plate, in particular a BPP.

In the production process, water is used for dispersion of the powder particles instead of using alcohol, in particular iso-propanol. The procedure described herein in free of alcohol, in particular iso-propanol.

Although, PTFE is a useful ingredient for binding, as discussed above, its amount should be below 50% by weight (wt %), and when used for a conducting separator plate, below 10 wt %, as explained in the following.

Figure 2:
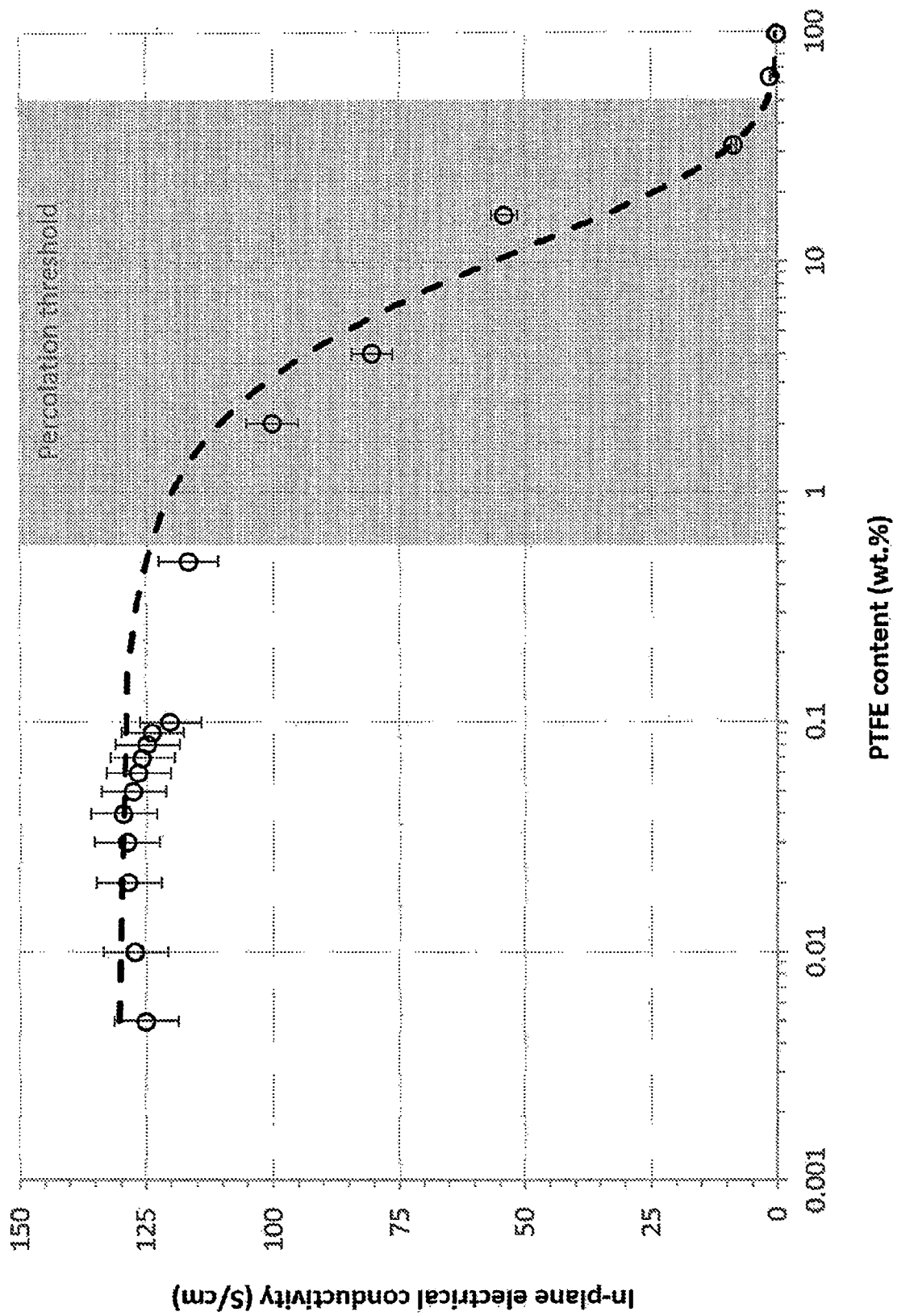
FIG. 2 is a graph illustrating conductivity as a function of PTFE content.

FIG. 2 illustrates a graph showing in-plane electrical conductivity as a function of the PTFE content. When the content of PTFE gets too high, the conductivity decreases to a level where the separator plate is not any longer useful.

A content of 50 wt. % of PTFE is regarded as an upper limit and percolation threshold. For a conductive separator plate, the PTFE content should be below 10 wt % and the carbon content above 70%. However, in order to achieve USA DOE's 2020 target, PTFE content is better set to lower than 2 wt. %. On the other hand, the content of PTFE cannot be infinitely low in order for it to perform a proper function. Therefore, 0.005 wt. % is regarded as a minimal amount of PTFE required to form pliable and malleable structure from the compound.

In relation to FIG. 2, it should be pointed out that, in real conditions, in-plane values of electrical conductivity are not as important as through-plane values. This is so because fuel cell stacks are assembled in a sandwich-like construction from Membrane Electrode Assemblies (MEAs) and BPPs, where current flows through the stack as it shown in FIG. 1. It should be noted that there is a significant difference between values of in-plane and through-plane electrical conductivity for BPPs due to anisotropic properties of graphite used therein. For example, in-plane electrical conductivity can reach 500 S/cm, while through-plane electrical conductivity can be much lower, for example less than 80 S/cm, depending on raw materials utilized and producing method.

It should also be mentioned that, in general, the highest values of electrical conductivity have been achieved with BPPs based on epoxy resins as binder. Unfortunately, this type of binder is not useful in HT-PEM fuel cells due to its solubility in hot acidic media.

In case of BPPs with PPS, binder values of in-plane and through-plane conductivity are significantly lower, namely 119-325 S/cm and 13-30 S/cm, respectively. For increasing the conductivity, the concentrations of PTFE must be low.

Experimentally, for low concentrations of PTFE, in particularly for PTFE concentrations lower than 0.1%, it has turned out that the result is better if a carbonate ester is added to water before mixing the PTFE with the water.

Figure 3:
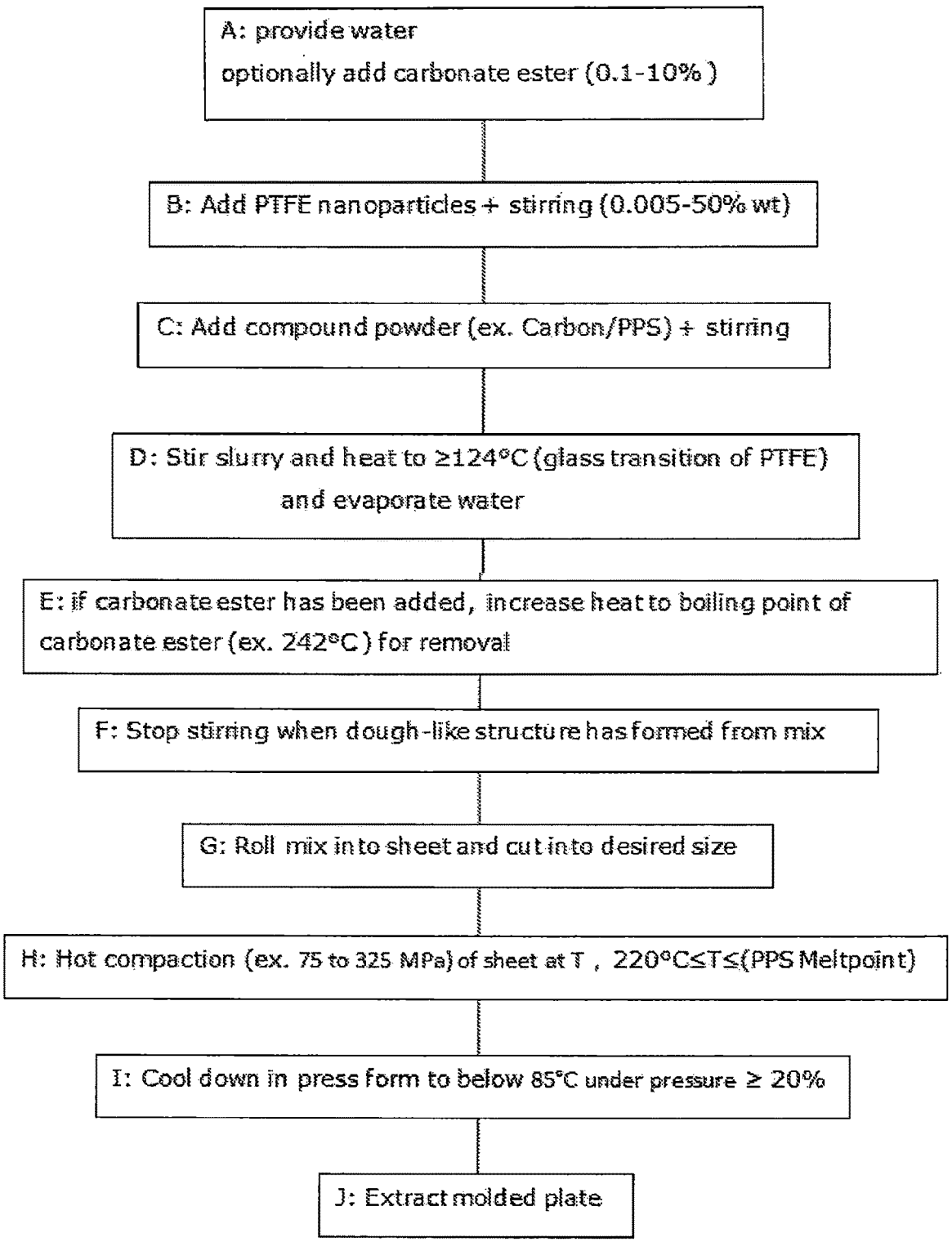
FIG. 3 illustrates a sequence of production steps.

The production method is illustrated in FIG. 3.

A quantity of deionized water is provided, for example in a 1.5:1 mass ratio to the compound. A desired amount of PTFE nanoparticles is mixed with the water, with or without surfactant, during its simultaneously stirring in order to reach a PTFE content in the compound from 0.005 to 50 wt. %, and in the range of 0.005 to 10 wt % for separator plates that are conducting.

For example a source of these PTFE particles, especially PTFE nanoparticles, is obtained as aqueous dispersion with 60 wt. % Teflon® PTFE dispersion from the company Chemours®.

Optionally, prior to mixing with the PTFE, the water is mixed with carbonate ester, e.g. propylene carbonate, to get a concentration of propylene carbonate in water between 0.1 and 10 wt. %. As mentioned above, this is useful for low PTFE concentrations, especially concentrations in the range of 0.005% and 0.1%.

Experimentally, a maximal value of through-plane electrical conductivity of 32.7 S/cm was achieved with 0.01 wt. % PTFE. With reference to FIG. 2, it should be mentioned that a through-plane conductivity within the "plateau" region of 0.005-0.1 wt. % PTFE is in the range of 32.7 to 20.7 S/cm.

As mentioned, the 2 wt. % PTFE is satisfying the DOE's 2020 target based on value of in-plane electrical conductivity. However, the through-plane electrical conductivity is only 40% of the maximum value, namely 12.2 S/cm.

In order to better understand these values of conductivity, they should be compared with values of through-plane conductivity for polybenzimidazole (PBI) membranes. This helps evaluating the contribution of the BPP's resistance to the total resistance of the fuel cell and therefore help in defining a maximum allowable PTFE content. For example, the through-plane electrical conductivity of PBI membranes doped with orthophosphoric acid is in the range of 40 to 63 mS/cm, depending on the temperature and the doping. Thus, the areal specific through-plane resistance of the membrane in fuel cell is expected between 0.08 and 0.2 $\Omega \cdot cm^2$ when considering a thickness range of 50-80 μm for doped membranes.

In comparison, an areal specific through-plane resistance of BPP produced by hot compaction with 0.73 mm thickness and 2 wt. % PTFE was calculated to 0.006 $\Omega \cdot cm^2$, which is only 3-7% from the total resistance and 1.67 times lower than the target value of 0.01 $\Omega \cdot cm^2$ from the US DOE.

One of the advantages of this invention is the possibility to produce very thin BPPs from a quasi-elastic pliable and malleable substance that is rolled to attain the required thickness. Accordingly, by varying the thickness to a low value, it is possible to keep a target contribution to the total resistance. For example, an averaged 5% from the total value is set as acceptance criteria for BPPs suitable for using in HT-PEM fuel cells.

It is possible to reduce the total contribution of the resistance of the BPP by decreasing its thickness or by decreasing the PTFE content. When the thickness is decreased, the concentration of PTFE can be increased while keeping a set maximum value for the resistance.

Data presented in Table 1 below correspond to two types of BPPs, namely "standard" or "thick" ones, where the thickness ≥0.6 mm, and "thin" ones with a thickness ≤0.3 mm, with different amounts of PTFE inside.

TABLE 1

Through-plane electrical conductivity and areal specific resistance of BPPs with different thickness and different PTFE content

| Type of BPP | Thickness (mm) | PTFE content (wt. %) | Through-plane electrical conductivity (S/cm) | Areal specific resistance ($\Omega \cdot cm^2$) |
|---|---|---|---|---|
| thick | 0.73 | 0.1 | 20.7 | 0.0035 |
| thin | 0.26 | 0.1 | 20.5 | 0.0013 |

TABLE 1-continued

Through-plane electrical conductivity and areal specific resistance of BPPs with different thickness and different PTFE content

| Type of BPP | Thickness (mm) | PTFE content (wt. %) | Through-plane electrical conductivity (S/cm) | Areal specific resistance ($\Omega \cdot cm^2$) |
|---|---|---|---|---|
| thick | 0.73 | 2 | 12.2 | 0.0060 |
| thin | 0.25 | 2 | 13.3 | 0.0019 |
| thick | 0.73 | 5 | 5.4 | 0.0140 |
| thin | 0.26 | 5 | 6.9 | 0.0038 |
| thick | 0.67 | 10 | 3.7 | 0.0180 |
| thin | 0.30 | 10 | 6.8 | 0.0044 |
| thick | 0.65 | 15 | 1.1 | 0.0590 |
| thin | 0.21 | 15 | 1.8 | 0.0120 |
| thick | 0.71 | 20 | 0.6 | 0.1180 |
| thin | 0.18 | 20 | 1.2 | 0.0150 |

As seen from the table given above, thin BPPs with 10 wt. % PTFE therein are still within the limits according to the USA DOE 2020 target with respect to their areal specific resistance, whereas values of their in-plane conductivity are less than half of the target values of the DOE.

Figure 4:
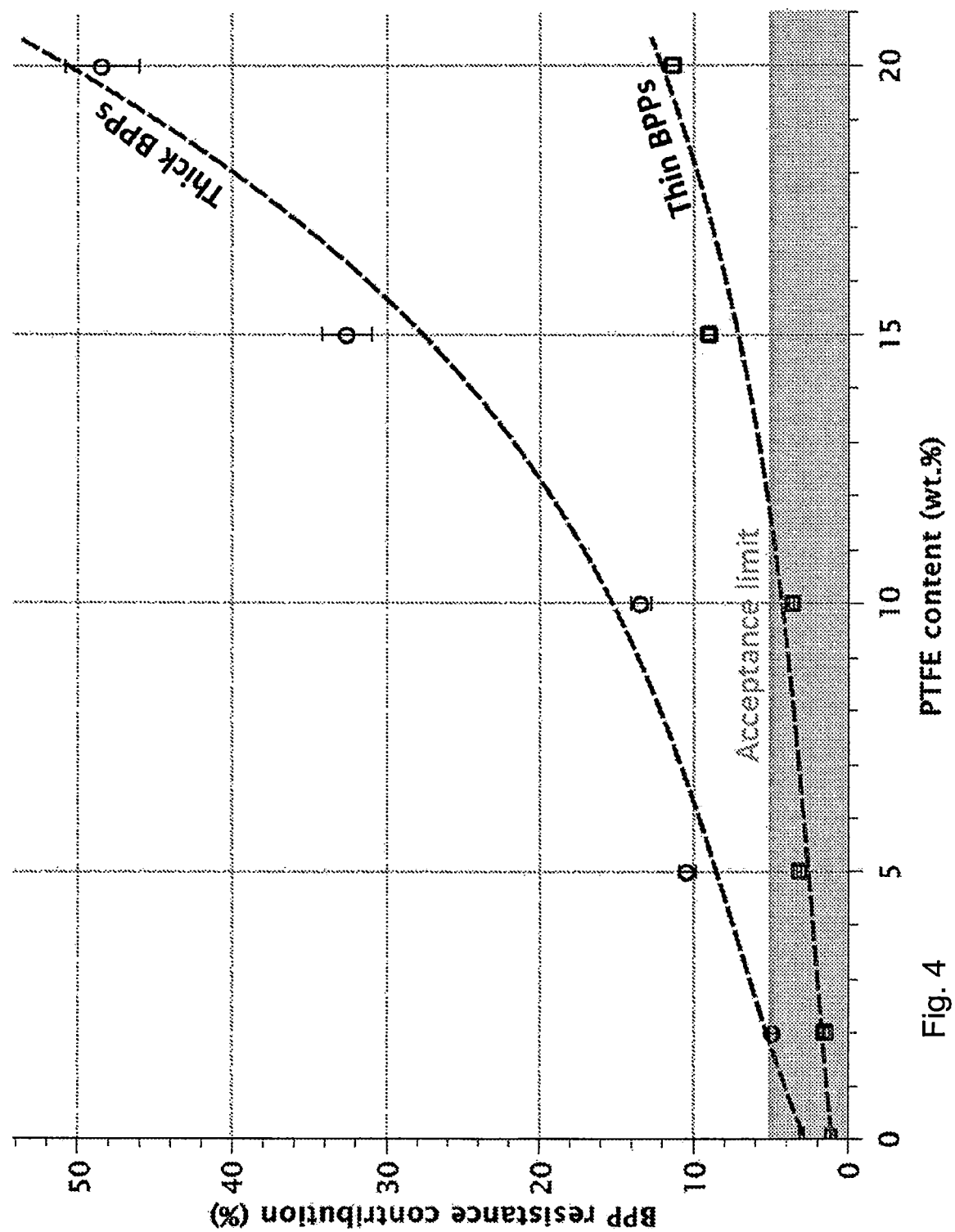
FIG. 4 is a graph illustrating the BPP resistance contribution to the total value of the fuel cell's resistance in dependence on the amount of PTFE contained in the BPPs.

FIG. 4 demonstrates benefits of thin BPPs with increased PTFE content. Areal specific resistance of thin BPPs, where PTFE content does not exceed 10 wt. %, gives no more than 5% of contribution to total value of fuel cell resistance.

Thus, based on the data from Table 1 and FIG. 4 as well as FIG. 2, advantageous ranges of PTFE can be defined for use in the described process for making a pliable and malleable material, where the PTFE content is 0.005-10 wt. % in general:

- 0.005-0.1 wt. %, yielding high electrical conductivity; advantageously a carbonate ester, for example propylene carbonate, is used as an additive;
- 0.1-2 wt. %, yielding lower electrical conductivity but within the DOE's 2020 target; this range does not need a carbonate ester, for example propylene carbonate, in the recipe;
- 2-10 wt. %, yielding even lower electrical conductivity and is not within the DOE's 2020 target, unless applied with ultra-thin separator plates, for example BPPs to match the acceptance criteria described above; this range does not need a carbonate ester, for example propylene carbonate, in the recipe.

With reference to FIG. 3, the method for production comprises the following steps.

After having mixed the PTFE into the water, potentially containing a carbonate eater, the compound powder, such as a mix of carbon and PSS, is added to the PTFE dispersion during simultaneously stirring in order to achieve uniform distribution of PTFE nanoparticles between components of the compound and to form a high-viscous slurry.

Stirring of the slurry is continued during heating up to at least 124° C. in order to reach the glass transition temperature of PTFE. As the temperature exceeds 100° C., water evaporates. The remaining viscous pliable and malleable substance is evolving into a relatively rigid amorphous form that is required for fibridization while the water is evaporated at the same time. The temperature is then increased up to the boiling point of the carbonate ester in order to remove it completely, for example e.g. till 242° C. in case of propylene carbonate.

Stirring of the carbon/PPS/PTFE mixture is stopped when a viscous pliable and malleable structure has been formed, which is then at this high temperature rolled into the required thickness for further cutting it into mats for the following hot compaction.

The graphite-based mat is placed into the press-form to perform its hot compaction under an applied pressure, e.g. from 75 to 325 MPa, within a temperature range between 220° C. and the melting point of PPS used in the compound. However, higher pressures and temperatures below but close to the melting point of PPS are preferred because higher values of in-plane electrical conductivity are reached for BPPs.

Figure 5:
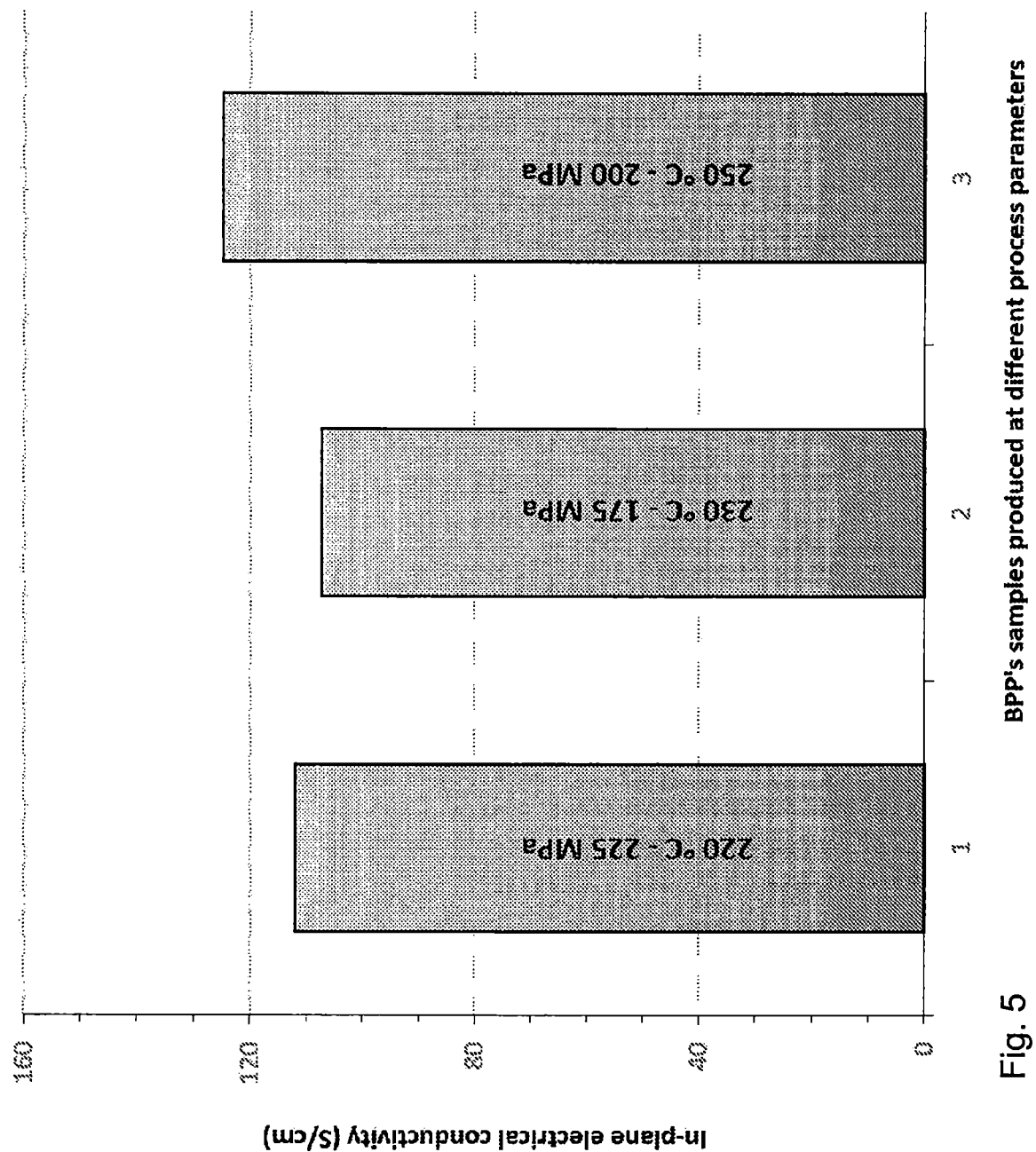
FIG. 5 is a diagram of in-plane electrical conductivity for BPPs produced with different process parameters.

This is illustrated in FIG. 5, where higher temperature and higher pressure increase the final conductivity. By optimizing the parameters, an even higher yield of 25% can be expected.

After the hot compaction, the moulded separator plate, for example BPP, is cooled-down, for example in the press-form, to below the glass transition temperature of PPS, i.e. lower than 85° C. in order to harden the plate. For example, the cooling is performed while the plate is under pressure, optionally with a pressure that is at least 20% of the pressure that was applied for hot compaction. After cooling down, the press-form is disassembled to extract the separator plate, for example BPP.

Adding of carbonate ester, for example propylene carbonate, has been found advantageous for the production of the pliable and malleable structure of the compound mixture when the PTFE content is ultra-low, e.g. lower than 0.1 wt. %. However, at higher concentrations of PTFE, use of a plasticizer, such as carbonate ester, in the composition has not been found necessary.

Optionally, a surfactant is added to the aqueous solution, for example at a concentration up to 10 wt. %, if wettability of the compound is not good enough for its uniform mixing with PTFE particles. Example of surfactants are Tergitol™ 15-S Series from Dow Chemicals,
Tween® Series from Croda International,
Triton® X Series from Union Carbide Corporation.

Triton X-100™ from the Triton X Series is nonionic and has a hydrophilic polyethylene oxide chain and an aromatic hydrocarbon lipophilic or hydrophobic group. The hydrocarbon group is a 4-phenyl group. The formula is C14H22O (C2H4O)n(n=9-10). It is commercially available from Sigma Aldrich®.

Producing BPPs by means of hot compaction of pliable and malleable mats as described here has great advantages as compared to conventional compression moulding process. In particular, an advantage is that the heating temperature is only moderately high. As it is below 300° C., especially below the melting point of PPS, risks for sticking are minimized. Also, as compared to prior art methods with temperatures above 300° C., the moderate temperature reduces the necessary time for cooling down, which production-wise is advantageous.

A number of further advantages are achieved with the production method described herein.

The aqueous PTFE dispersion is diluted with water but without the need of alcohol, in particular iso-propanol, which in contrast to the method in WO2018/072803. The avoidance of iso-propanol also reduces the agglomeration of polymer nanoparticles and therefore better distributes the particles inside the compound.

As the total amount of water is relatively low relatively to the solid content, for example only 40 wt. %, there is no necessity to evaporate large volumes of liquids or pump the slurry through sieves.

As the mixing process occurs in aqueous media, optionally with a small addition of carbonate ester as high-boiling plasticizer, there is no fire hazard and toxic effect in contrast to WO2018/072803, where a high-concentrated solution based on iso-propyl alcohol is utilized.

Due to better PTFE dispersing in water as compared to iso-propanol, a 100-fold decreasing of PTFE content is possible for forming the pliable and malleable structure, namely as low as 0.005 wt. % as compared to 0.5 wt. % in WO2018/072803, which results in increased electrical conductivity of separator plates, for example BPPs.

Due to these advantages the invention provides a method with reduced production cost of BPPs as compared to WO2018/072803.

The BPPs that were experimentally produced in this invention with a thickness of about 0.2 mm are the thinnest graphite-based BPPs presently available. In comparison the company Horizon Fuel Cell Technologies® has announced development of 0.85 mm thick BPPs in the end of 2018 and the company SGL Carbon® currently offers 0.6 mm thick BPPs, but their density is not very high, namely only 1.65-1.75 g/cm3.

Physical properties of the BPPs with PTFE content lower than 2 wt. % produced according to the method described above have been summarized in Table 2, where the same data from other BPP's manufacturers are also presented for comparison.

TABLE 2

Physical properties of BPPs

| Physical properties of BPPs | This invention | Virginia Tech ® | FJ Composite ® | Shin-Etsu ® |
|---|---|---|---|---|
| In-plane electrical conductivity (S/cm) | 107-153 | 271 | 250 | 215-225 |
| Through-plane electrical conductivity (S/cm) | 12-33 | 19 | N/A | N/A |
| Areal specific resistance ($\Omega \cdot cm^2$) | 0.001-0.006 | 0.01-0.02 | 0.004 | 0.005 |
| Density (g/cm$^3$) | 2.0-2.2 | N/A | 2.0 | N/A |
| Thickness (mm) | 0.2-1.2 | 2.0-3.0 | N/A | 2.0-2.1 |

When comparing the results as given in Table 2, it is observed that the through-plane conductivity is superior, despite a lower in-plane conductivity. The importance of a low through-plane conductivity was discussed above.

The invention claimed is:

1. A method of producing a separator plate, the method comprising:
   providing a material blend of powder containing at least 70% carbon powder,
   10-20% of polyphenylene sulfide, PPS, and
   0.005-10% Polytetrafluoroethylene, PTFE,
   all percentages by weight of the sum of the total weight of the powder; providing an aqueous suspension with the powder;
   determining whether the amount of PTFE is higher or lower than 0.1% and providing the suspension with a carbonate ester only if the amount of PTFE is lower than 0.1%, wherein the concentration of the carbonate ester is 0.1-10% relatively to the total content of liquid in the suspension;
   heating the carbon/PSS/PTFE suspension to above the glass transition temperature of 124° C. of PTFE but below the melting point of PPS for causing fibridization of the PTFE and for causing evaporation of water from the suspension and providing a malleable and pliable substance as a remainder;
   press rolling the malleable and pliable substance into a sheet;
   characterized in that the method comprises hot-compacting the sheet in a press-form at a first pressure P1 and at a temperature T to form a separator plate, wherein T is above 220° C. and below the melting point of PPS.

2. The method according to claim 1, wherein the method comprises use of water for dispersion of the powder for providing the aqueous suspension.

3. The method according to claim 2, wherein the method comprises providing the aqueous suspension free of alcohol, for example free of iso-propanol.

4. The method according to claim 1, wherein method comprises providing the suspension with carbonate ester at a concentration of 0.1-10% relatively to the total content of liquid in the suspension.

5. The method according to claim 1, wherein the carbonate ester is propylene carbonate.

6. The method according to claim 1, wherein method comprises heating the carbon/PSS/PTFE suspension to a boiling point of carbonate ester for evaporation of the carbonate ester prior to press rolling the malleable and pliable substance into a sheet.

7. The method according to claim 1, wherein the method comprises hot-compacting the separator plate at a first pressure P1 in the range of 75 to 325 MPa.

8. The method according to claim 1, wherein the separator plate is cooled down in the press-form to below 85° C. while maintaining a second pressure P2, wherein P2 is in the range of 20% to 100% of P1.

9. The method according to claim 1, wherein the separator plate is a bipolar plate, and the method comprises moulding the sheet into a bipolar plate with a flow channel pattern on each side of the bipolar plate.

10. A method of producing a fuel cell stack, the method comprising, producing a plurality of separator plates by a method according to claim 1, arranging the separator plates as an array with fuel cell membranes between the separator plates, the membranes separating the hydrogen fuel from the oxygen gas.

11. A separator plate for a fuel cell obtainable by a method according to claim 1.

12. The separator plate according to claim 11, wherein the separator plate is a bipolar plate for a fuel cell.

13. A method of producing a separator plate, the method comprising:
   providing a material blend of powder containing at least 70% carbon powder,
   10-20% of polyphenylene sulfide, PPS,
   0.005-10% PolyTetraFluoroEthylene, PTFE, and
   the use of water for dispersion of the powder for providing the aqueous suspension free of alcohol, for example free of iso-propanol;
   all percentages by weight of the sum of the total weight of the powder; providing an aqueous suspension with the powder;
   heating the carbon/PSS/PTFE suspension to above the glass transition temperature of 124° C. of PTFE but below the melting point of PPS for causing fibridization of the PTFE and for causing evaporation of water from the suspension and providing a malleable and pliable substance as a remainder;
   press rolling the malleable and pliable substance into a sheet;

characterized in that the method comprises hot-compacting the sheet in a press-form at a first pressure P1 and at a temperature T to form a separator plate, wherein T is above 220° C. and below the melting point of PPS.

14. A separator plate for a fuel cell obtainable by a method according to claim 13.

15. The separator plate according to claim 14, wherein the separator plate is a bipolar plate for a fuel cell.

\* \* \* \* \*